March 2, 1954

A. R. WORSTER ET AL 2,670,716

DUAL RANGE SERVOMOTOR RESPONSIVE
TO FLUID PRESSURE VARIATIONS

Filed Oct. 20, 1951

INVENTORS
ARTHUR R. WORSTER
CLYDE E. HOLVENSTOT
BY
THEIR ATTORNEY

Patented Mar. 2, 1954

2,670,716

UNITED STATES PATENT OFFICE 2,670,716

DUAL RANGE SERVOMOTOR RESPONSIVE TO FLUID PRESSURE VARIATIONS

Arthur R. Worster, Painted Post, and Clyde E. Holvenstot, Corning, N. Y., assignors to Ingersoll-Rand Company, New York, N. Y., a corporation of New Jersey Application October 20, 1951, Serial No. 252,297

5 Claims. (Cl. 121—41)

1

This invention relates to servo-motors, and more particularly to a servo-motor adapted to act in response to slight variations in pressure of a pilot fluid for controlling the movement of a power member capable of exerting a force of far greater magnitude than such pressure variations.

It is, accordingly, one object of this invention to construct a servo-motor which is responsive to slight variations in fluid pressure for controlling a force of greater magnitude than such variations in the pressure fluid.

A further object of this invention is to provide a servo-motor in which movement of the power member is directly proportional to the variations in pressure of the pilot fluid, and in which this proportion is of one value below some predetermined pressure of the pilot fluid, and a different value whenever the pressure of the pilot fluid is above said predetermined value.

Further objects of this invention will become obvious from the following specification accompanied by a drawing, in which.

Figure 1:
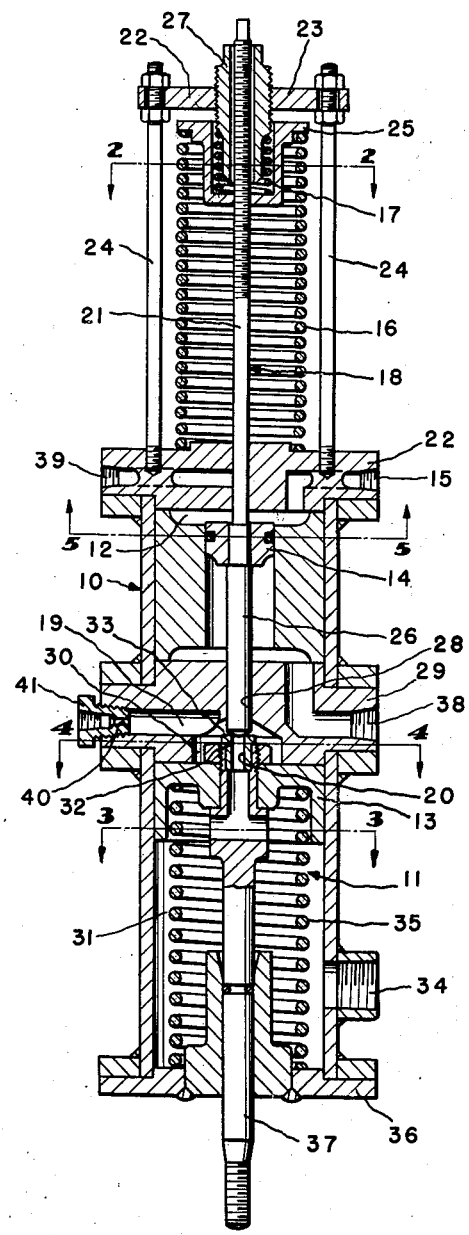
Figure 1 is a longitudinal sectional view of a preferred form of the invention.
Figure 2:
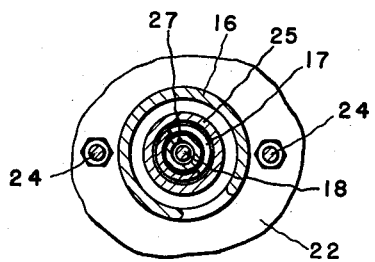
Figures 2, 3, 4 and 5 are transverse views taken through Fig. 1 looking in the direction of the arrows.
Figure 3:
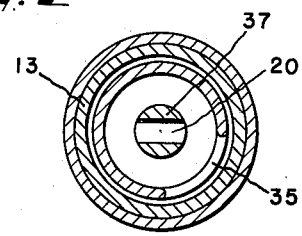
Figure 4:
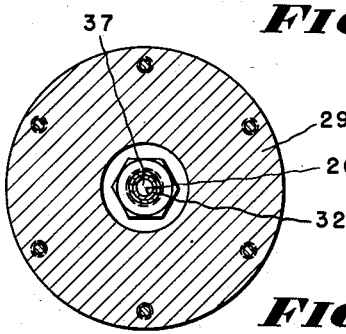
Figure 5:
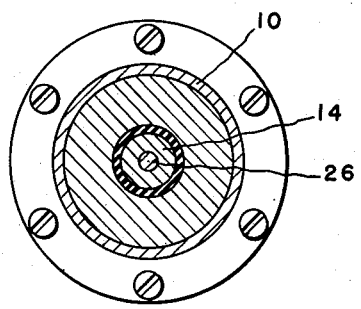

Referring to Figure 1, a servo-motor constructed in accordance with the practice of the invention comprises, in general, a casing 10 defining a power chamber 11 and a pilot chamber 12 in which reciprocates, respectively, a power member 13 and a pilot member 14. The pilot member, or piston, 14 is normally constantly urged in one direction (downward as viewed in Figure 1) throughout the entire cycle of the piston 14 by pilot pressure fluid conducted to one end of the pilot chamber 12 through a passage 15. Means—such as the spring 17—are provided to exert a force on the piston 14 in the same direction as that exerted by pressure fluid during part only of the cycle of the piston. These forces are opposed by a spring 16 which acts, as does the spring 17, against the piston rod 18 of the piston 14. With this arrangement, whenever the pressure within the chamber 12 increases, the piston 14 moves downward compressing the spring 16 and relaxing spring 17 until the force exerted by the spring 16 is equal to the combined forces exerted by the spring 17 and pressure fluid acting on the piston 14. A decrease in pilot pressure results in upward movement of the piston 14 under the influence

2 of the spring 16; the spring 17 is, of course, compressed by such movement.

Movement of the piston 14 serves to control the supply of power to actuate the power piston 13. More particularly, pressure fluid is conducted to one end of the power chamber 11 through a passage 19 to actuate the piston in one direction. A spring 35, or other compressible means, urges the piston 13 in the opposite direction. The pilot piston 14 controls the pressure of fluid acting against the piston 13 by varying the rate of flow of such fluid out of the power chamber through an outlet 20.

Referring in greater detail to the construction of the servo-motor, the piston 14 is mounted intermediate the ends of the piston rod 18. The upper end portion 21 of the rod 18 extends slidably through an end cover 22 and is supported at its extreme end portion by a guide member 23 mounted on bolts 24 threaded in the cover 22. The spring 16 is biased between the end cover 22 and a spring retainer 25 threaded on the piston rod 18; and the spring 17 is biased between the spring retainer 25 and a sleeve 27 threaded in the guide member 23 to oppose the force exerted by the spring 17.

The opposite, or lower, end portion 26 of the rod 18 extends slidably through a central perforation 28 in a cylindrical member 29 forming a partition between the power and pilot chambers 11 and 12, respectively. This end portion 26 of the piston rod 18 serves as a valve means and in furtherance to this end is arranged coaxially with the outlet passage 20 formed in the piston 13 and piston rod 37 and communicating the power chamber portions 30 and 31 above and below, respectively, the piston 13. Threaded in the mouth of the outlet 20 is a bushing 32 forming a seat for the lower end of the rod 18 such that movement of the rod 18 toward its seat 33 serves to reduce the effective flow area through the passage 20, and movement of the rod away from the seat 33 increases such flow area. The portion 31 of the chamber 11 is communicated with the atmosphere through a port 34 so that movement of the rod 18, relative to the piston 13, controls the escape of power fluid from the power chamber; and inasmuch as the flow of pressure fluid into the power chamber is limited by an orifice 40 in a plug 41 threaded in the passage 19, such movement controls the pressure value of fluid in the portion 30 of the chamber 11.

Downward movement of the power piston under the force of pressure fluid in the power chamber is opposed by the spring 35 biased between the lower surface of the piston 13 and an end cover 36 mounted on the end of the casing 10 and arranged to support and guide the piston rod 37. The lower end of the rod 37 extends through the cover 36 and is adapted to be connected to the device to be operated (not shown).

A passage 38 formed in the partition 29 communicates the lower end of the chamber 12 with the atmosphere to permit the escape of pressure fluid leaking into this portion of the chamber 12 from the power chamber 11 along the piston rod 18 or from the upper portion of the pilot chamber past the pilot piston 14. The passage 19 is also formed in the partition 29. The passage 15 for conveying pilot pressure fluid to the chamber 12 from a variable pressure source (not shown) is formed in the end cover 22. A leak passage 39 also formed in the end cover 22 conveys any leakage of pressure fluid from the chamber 12 along the portion of the shaft extending through the cover 22 to the atmosphere.

In the operation of the servo-motor, and referring first only to the forces acting on the pilot piston 14, assume that the fluid pressure force acting against the piston 14 exerts a downwardly directed force of ten pounds. If the piston 14 is at or near the upper end portion of the chamber 12—such a position as is shown in Fig. 1—the spring 17 will also exert a downwardly directed force, say for example five pounds, on the rod 18. Accordingly the downwardly directed net force is fifteen pounds. This force will be opposed by a fifteen pound force exerted in the upwardly direction on the piston 14 by the spring 16. In the event that the pressure of the pilot fluid varies so that the force exerted on the piston by such fluid increases to say twenty pounds, the piston 14 will move downward compressing the spring 16 and permitting extension of the spring 17. For the sake of example, it will be assumed that the piston 14 moved one inch and that the force exerted by the spring 17 was reduced to two pounds. At this point the downwardly directed net force is twenty-two pounds. Accordingly, the spring 16 exerts, due to its compressing, an upwardly directed force of twenty-two pounds.

Given these conditions, the position of the piston 14 and the corresponding spring forces can be determined for any pilot pressure. Moreover, it can be shown that once the spring 17 is fully extended, a smaller change in pressure is required to move the piston 14 a given distance than when the spring 17 is compressed. This is perhaps best illustrated by carrying out further and analyzing the example given. The forces exerted by the springs 16 and 17 and the piston 14 for various positions of the valve 26 are as follows:

| Position | Force of Piston 14 | Force of Spring 17 | Force of Spring 16 | Total Distance Piston 14 Moves |
|---|---|---|---|---|
| A | 10 | 5 | 15 | |
| B | 20 | 2 | 22 | 1 |
| C | 26⅔ | 0 | 26⅔ | 1⅔ |
| D | 38⅓ | 0 | 38⅓ | 3⅓ |

Movement of the piston 14 of one inch between position A and B defines a spring scale of 3 pounds per inch for spring 17 and a spring scale of 7 pounds per inch for spring 16.

At position C the spring 17 is fully extended and the piston will have moved 1⅔ inches from position A. It is to be noted that for this movement (A to C) of 1⅔ inches, during which the spring 17 was under compression, the force exerted by the piston 14 was increased 16⅔ pounds. However, with the spring 17 completely extended (position C) it requires an increase in piston force of only 11⅔ pounds (1⅔×7) to move the piston 1⅔ inches (position D). That is, it is necessary only to overcome the force exerted by the spring 16. It follows, therefore, that a smaller force (or pressure change in chamber 12) is required to move the piston 14 a given distance after the spring 17 is completely extended than is required to move the piston the same distance when the spring 17 is under compression. In other words, the spring 16 and pressure fluid acting against the piston 14 serve as means for exerting opposing forces against the piston throughout its entire stroke or cycle, whereas the spring 17 exerts a force in the same direction as the pilot fluid during a portion only of the piston stroke.

Referring now to the effect of the movement of the rod 18 on the operation of the power piston 13, and assuming, initially, that the spring 35 exerts an upwardly directed force of thirty pounds on the rod 37 and that the pressure of the power fluid in the power chamber 11 is sufficient to exert a downwardly directed force of thirty pounds on the rod 37, movement of the rod 18 downwardly towards the seat 33 decreases the flow area through the passage 20 thereby increasing the pressure within the chamber portion 30. This increase in pressure causes the piston 13 to move downwardly compressing the spring 35. So long as the rod 18 moves downwardly restricting the flow of power fluid through the passage 20, the piston 13 will be forced downwardly ahead of the rod 18. When the movement of the rod 18 is halted, due to a balance of the forces previously mentioned, the piston 13 will assume a position, relative to the end of the rod 18, such that the flow area through the passage 20 maintains a pressure within the power chamber 31 sufficient to exert a force on the piston 13 equal to the opposing force exerted by the spring 35.

Movement of the pilot piston upwardly, such that the end of the rod 18 moves away from its seat 33, increases the flow area through the passage 20 so that the pressure of the power fluid in the power chamber 11 decreases, the spring 35 will then move the piston 13 upwardly towards the end of the rod 18 until the flow area through the passage 20 is again decreased to increase the pressure of power fluid and establish an equilibrium of forces on the piston 13.

In the example, it was assumed that the pressure within the power chamber 11 was sufficient to exert a downwardly directed force of thirty pounds on the rod 37. In practice, this pressure may vary over a considerable range and control a force of three hundred pounds as easily as a force of thirty pounds. That is, the pressure within the power chamber does not in any manner effect the operation of the pilot piston, beyond the slight fluid pressure force exerted on the lower end of the piston rod 18.

In describing the operation of the servo-motor, it was assumed that the pressure at the source communicated with the pilot chamber 12 varied over a range of positive pressures only. The operation of the servo-motor is not, however, dependent on such a pressure condition, but will operate equally effectively where the pilot pressure varies from a negative value, or vacuum, to a positive value.

Under such a condition, whenever the pilot pressure is less than atmospheric, the force of the spring 16 and the force of atmospheric pressure acting on the lower surface of the pilot piston 14 urges the piston 14 in one direction and these forces are opposed by the spring 17. When the pilot pressure reaches a positive value, i. e., a pressure value above atmospheric pressure, the pilot pressure then exerts a downwardly directed force on the pilot piston 14 in the manner previously discussed. Thus whether the pilot pressure at the source is a positive or negative value, it serves to exert a force on the pilot piston through the entire piston cycle.

It is to be noted that inasmuch as the spring retainer 25 is adjustably mounted on the piston rod 18—the retainer 25 is threaded on the rod 18—the pressure at which the servo-mechanism comes into operation may be readily adjusted by merely rotating the spring retainer 25 on the rod 18 to vary the force exerted by the spring 16. Moreover, by adjusting the sleeve 27, relative to the spring retainer 25, the spring 17 can be made to reach complete extension at any desired point in the piston cycle. In other words, the latter adjustment permits the change in ratio, hereinbefore referred to, between variations in pilot pressure and movement of the power piston to be made to occur at any pilot pressure value desired.

While we have shown and described a specific form of our invention, it is to be understood that various changes and modifications may be made without departing from the spirit of the invention as set forth in the appended claims.

We claim:

1. A servo-motor comprising a casing, a power member in the casing, means for continuously supplying power to actuate the power piston, a pilot member, a valve member connected to said pilot member and arranged to control the supply of power to actuate the power member, means for constantly urging the pilot member in one direction throughout the entire cycle of the pilot member, means for urging the pilot member in the opposite direction, and means urging the pilot member in the same direction as the second said means during part only of the cycle of the pilot member.

2. A servo-motor comprising a casing, a power member in the casing, means for continuously supplying power to the casing to exert a force on the power member in one direction, compressible means for opposing said force, a pilot member in the casing, valve means connected to said pilot member and arranged to vary said force, means for constantly urging the pilot member in one direction throughout the entire stroke of the pilot member, means for opposing the force exerted on the pilot member by the last said means, and means urging the pilot member in the same direction as the third said means during part only of the cycle of the pilot member.

3. A servo-motor comprising a casing having a power chamber and a pilot chamber therein, a power piston reciprocable in the power chamber, a passage for continuously supplying pressure fluid to the power chamber to actuate the power piston, a spring arranged to oppose movement of the power piston by the pressure fluid, a pilot piston reciprocable in the pilot chamber, a valve connected to the pilot piston and arranged to control the pressure of fluid in the power chamber, means for constantly urging the pilot member in one direction throughout the entire stroke of the pilot member, a spring arranged to urge the pilot piston in the opposite direction, and means urging the pilot member in the same direction as the last said means during part only of the cycle of the pilot piston.

4. A servo-motor comprising a casing having a pilot chamber and a power chamber therein, a power piston reciprocable in the power chamber and adapted to be connected to the device to be actuated, a spring constantly urging the power piston in one direction, a passage for supplying pressure fluid to the power chamber for actuating the power piston in the opposite direction, an outlet for the power chamber, a pilot piston in the pilot chamber, valve means connected to the pilot piston and arranged to control the rate of flow through said outlet for varying the pressure of fluid in the power chamber, a conduit for conducting pressure fluid to the pilot chamber for actuating the pilot piston in one direction, a spring connected to urge the pilot piston in the same direction during part only of the stroke of said piston, and a spring constantly urging the pilot piston in the opposite direction.

5. A servo-motor comprising a casing having a pilot chamber and a power chamber therein, a power piston reciprocable in the power chamber and adapted to be connected to the device to be actuated, a spring constantly urging the power piston in one direction, a passage for supplying pressure fluid to the power chamber for actuating the power piston in the opposite direction, means for restricting the flow of pressure fluid through said passage, an outlet formed in the power piston to permit the escape of pressure fluid from the power chamber, a pilot piston in the pilot chamber, a valve connected to the pilot piston and arranged such that movement of the pilot piston controls the rate of flow through said outlet to vary the pressure of fluid in the power chamber, a conduit for communicating the pilot chamber with a pressure source, a spring for urging the pilot piston in one direction during at least part of the piston stroke, and a spring constantly urging the pilot piston in the opposite direction throughout the entire stroke of the pilot piston.

ARTHUR R. WORSTER.
CLYDE E. HOLVENSTOT.

References Cited in the file of this patent

UNITED STATES PATENTS

| Number | Name | Date |
|---|---|---|
| 1,141,975 | Osborne | June 8, 1915 |
| 1,585,529 | Boving | May 18, 1926 |
| 2,020,847 | Mitereff | Nov. 12, 1935 |
| 2,153,381 | Maas | Apr. 4, 1939 |
| 2,353,610 | Chisholm, Jr. | July 11, 1944 |
| 2,411,747 | Nelson | Nov. 26, 1946 |
| 2,418,129 | Larson | Apr. 1, 1947 |
| 2,486,047 | Marinelli | Oct. 25, 1949 |

FOREIGN PATENTS

| Number | Country | Date |
|---|---|---|
| 295,290 | Great Britain | Oct. 31, 1929 |